United States Patent
Clarembeau et al.

(10) Patent No.: US 9,175,106 B2
(45) Date of Patent: Nov. 3, 2015

(54) ACTIVATING SUPPORTS

(75) Inventors: Michel Clarembeau, Temploux (BE); Gaelle Pannier, Brussels (BE); Stephane Paye, Leuze (BE)

(73) Assignee: INEOS EUROPE AG, Vaud (CH)

( * ) Notice: Subject to any disclaimer, the term of this patent is extended or adjusted under 35 U.S.C. 154(b) by 0 days.

(21) Appl. No.: 13/988,136

(22) PCT Filed: Dec. 14, 2011

(86) PCT No.: PCT/EP2011/072726
§ 371 (c)(1),
(2), (4) Date: May 17, 2013

(87) PCT Pub. No.: WO2012/080314
PCT Pub. Date: Jun. 21, 2012

(65) Prior Publication Data
US 2013/0245214 A1   Sep. 19, 2013

(30) Foreign Application Priority Data

Dec. 15, 2010   (EP) .................................... 10195224

(51) Int. Cl.
| | | |
|---|---|---|
| C08F 4/02 | (2006.01) | |
| C08F 4/642 | (2006.01) | |
| C08F 4/6592 | (2006.01) | |
| C08F 210/16 | (2006.01) | |
| C08F 4/76 | (2006.01) | |
| C08F 4/659 | (2006.01) | |
| B01J 21/08 | (2006.01) | |
| B01J 27/12 | (2006.01) | |
| B01J 37/02 | (2006.01) | |
| B01J 37/08 | (2006.01) | |
| B01J 37/26 | (2006.01) | |
| C08F 4/52 | (2006.01) | |
| B01J 31/02 | (2006.01) | |
| B01J 31/12 | (2006.01) | |
| B01J 31/22 | (2006.01) | |

(52) U.S. Cl.
CPC . *C08F 4/76* (2013.01); *B01J 21/08* (2013.01); *B01J 27/12* (2013.01); *B01J 37/0209* (2013.01); *B01J 37/086* (2013.01); *B01J 37/26* (2013.01); *C08F 4/02* (2013.01); *C08F 4/52* (2013.01); *C08F 4/65916* (2013.01); *C08F 210/16* (2013.01); *B01J 31/0231* (2013.01); *B01J 31/122* (2013.01); *B01J 31/2295* (2013.01); *C08F 4/6592* (2013.01); *C08F 4/65912* (2013.01)

(58) Field of Classification Search
CPC .... C08F 4/02; C08F 4/65916; C08F 4/65912; C08F 4/6592; C08F 10/02; C08F 210/16
USPC .......... 502/439, 103, 120, 152; 526/129, 130, 526/165, 348, 348.2, 943
See application file for complete search history.

(56) References Cited

U.S. PATENT DOCUMENTS

| | | | |
|---|---|---|---|
| 7,022,782 B2 | 4/2006 | Ogane | |
| 7,202,316 B2 | 4/2007 | Takaoki | |
| 7,524,789 B2 | 4/2009 | Oshima et al. | |
| 8,426,539 B2 * | 4/2013 | Prades et al. | .................. 526/161 |
| 2005/0245701 A1 | 11/2005 | Oshima et al. | |

FOREIGN PATENT DOCUMENTS

| | | | |
|---|---|---|---|
| EP | 2 251 362 A1 | | 11/2010 |
| WO | WO 2007/014889 | * | 8/2007 |
| WO | WO 2008/036591 A2 | | 3/2008 |
| WO | WO 2008/036591 A3 | | 3/2008 |

\* cited by examiner

*Primary Examiner* — Caixia Lu
(74) *Attorney, Agent, or Firm* — Nixon & Vanderhye P.C.

(57) ABSTRACT

Activating supports are prepared by (a) combining (i) fluorine-containing compounds having a reactive group and (ii) an organometallic compound, (b) contacting a porous mineral oxide support material with the mixture from step (a), (c) heating the functionalized support from step (b) under an inert gas and then under an atmosphere comprising oxygen, and (d) recovering the activating support. The fluorine-containing compounds may have the formula R(Fn)-X wherein R is hydrocarbyl, substituted hydrocarbyl, heterohydrocarbyl or substituted heterohydrocarbyl with up to 20 non-hydrogen atoms, n is 1-41, X is OH, SH or NR'$_2$, R' is hydrogen or hydrocarbyl. The activating supports are useful in combination with transition metal catalysts for polymerization of olefins, e.g., with metallocene complexes. Preparation of the activating supports is easier and more economic than prior methods and provides for supported polymerization catalyst systems having excellent activities. Polymers produced using the activating supports exhibit improved rheology properties.

23 Claims, 2 Drawing Sheets

ACTIVATING SUPPORTS

This application is the U.S. national phase of International Application No. PCT/EP2011/072726 filed 14 Dec. 2011 which designated the U.S. and claims priority to European Patent Application No. 10195224.0 filed 15 Dec. 2010, the entire contents of each of which are hereby incorporated by reference.

The present invention relates to supported catalysts suitable for the polymerization of olefins and in particular to activating supports and a method for their preparation. The use of the activating supports, in particular with metallocene catalysts, provides advantages for operation in both gas and slurry phase processes for the polymerization of ethylene or the copolymerization of ethylene and α-olefins having from 3 to 10 carbon atoms.

BACKGROUND OF THE INVENTION

In recent years there have been many advances in the production of polyolefin homopolymers and copolymers due to the introduction of single site catalysts such as metallocene catalysts. Metallo catalysts and are usually described as catalysts which are single site in nature.

The above single site catalyst systems such as metallocene complexes may be used for the polymerization of olefins in solution, slurry or gas phase. When used in the slurry or gas phase the metallocene complex and/or the activator are suitably supported. Typical supports include inorganic oxides eg. silica or polymeric supports may alternatively be used.

Examples of the preparation of supported metallocene catalysts for the polymerization of olefins may be found in WO 94/26793, WO 95/07939, WO 96/00245, WO 96/04318, WO 97/02297 and EP 642536.

The above supported polymerization c cene catalysts offer the advantage of generally a higher activity than traditional Ziegler catalyst systems may in some cases lead to certain disadvantages such as cost, instabilities as well as poor morphology of the resultant polymers as well as problems with gels and the like when subsequently transformed into films and other articles.

In recent years attempts have been made to replace the activator or cocatalyst components of the supported polymerization catalyst systems by use of activating supports.

EP 906920 describes fluorine-containing activator solid supports for metallocenes wherein the surface of the support has been modified by aluminium (or magnesium) Lewis-acid sites of formula Al—F or AlF$_2$. The supports are prepared by a method comprising reaction of the surface —OH radicals with a functionalisation agent followed by fluorination.

WO 2005/075525 describes methods for preparing activating supports for metallocenes wherein the supports are treated with fluorinated functionalizing agents followed by heating and treatment with oxygen.

WO 2007/014889 describes similar supports prepared by functionalizing the support with an alkylating agent followed by heating under an inert gas then under oxygen and finally treatment with a fluorinating agent.

WO 2007/12465 describes fluorinated transition metal catalysts based on supports comprising bonding sequences selected from Si—O—Al—F, F—Si—O—Al, F—Si—O—Al—F.

WO 2007/131856 describes mono- or di-fluorinated metallocene catalyst components supported on fluorinated activating supports.

WO 2010/037808 describes activating supports based on perfluorinated boronic acids and aluminium alkyls and their use in the activation of metallocene complexes.

WO 2007/005676 describes activator compositions based on metal oxide supports having surface hydrogen-bonded hydroxyl groups and organoaluminium compounds having bulky functional ligands resulting in aluminate anions covalently bonded to the metal oxide via two chelating oxygen atoms.

US 2008/0319148 describes the use of halogenated alcohols or amines in the preparation of modified supports suitable for use in the polymerization of olefins.

SUMMARY OF THE INVENTION

We have now surprising found novel activating supports based on fluorine-containing compounds and organometallic compounds and which may be used for the activation of transition metal compounds to provide supported catalyst systems for the polymerization of olefins. The novel activating supports are intended to be used as replacements for the traditional activators such as methyl aluminoxane and borates and also lead to supported catalyst systems showing improved activities. We have further found that these novel supported catalysts lead to improved rheological properties of the polymer resulting in improved extrudability and bubble stability during film blowing process.

The preparation of the activating supports of the present invention has the advantage of avoiding the use of a fluorination step involving the liberation of hydrogen fluoride.

In addition the use of the activating supports of the present invention in olefin polymerization results in polymers having improved rheology properties.

Thus according to a first aspect of the present invention there is provided an activating support prepared by the steps of (a) combining (i) a fluorine-containing compound having a reactive group and (ii) an organometallic compound,
(b) addition of a porous mineral oxide support material,
(c) heating the functionalized support from step (b) under an inert gas and then under an atmosphere comprising oxygen, and
(d) recovering the activating support.

Suitable fluorine-containing compounds are those having a group capable of reacting with the organometallic compound.

Preferred fluorine-containing compounds have the formula:

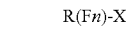

R(F$n$)-X wherein
R is hydrocarbyl, substituted hydrocarbyl, heterohydrocarbyl or substituted heterohydrocarbyl with up to 20 non-hydrogen atoms
n is 1-41
X is OH, SH or NR'$_2$
R' is hydrogen or hydrocarbyl,
Preferably R is hydrocarbyl and most preferably alkyl.
Preferably n is 1-6.
Preferably X is OH.

Fluorine-Containing Compound

Suitable compounds include fluorine-containing alcohols, phenols, thiols and amines.

Suitable aliphatic alcohols include 2,2,2-trifluoroethanol and 1,1,1,3,3,3-hexafluoropropan-2-ol.

The preferred alcohol is 2,2,2-trifluoroethanol.

Suitable aromatic alcohols include 2-fluorophenol, 3-fluorophenol, 3,5-difluorophenol, 4-fluorophenol, 3,4,5-trifluorophenol and 4-(trifluoromethyl)phenol.

A particularly preferred phenol is pentafluorophenol.

Suitable thiols include 2-fluorobenzenethiol, 3-fluorobenzenethiol, and 4-fluorobenzenethiol.

Suitable amines include 2-bromo-6-fluoroaniline and 2-bromo-4,6-difluoroaniline.

Organometallic Compound

The organometallic compound is typically selected from an alkylated derivative of a metal of Groups 1, 2 or 13 and is preferably a metal of Group 13.

Preferred metals are aluminium, boron, lithium or magnesium.

Preferably the organometallic compound is selected from an alkylated derivative of aluminium or boron such as triethylaluminium or triethylboron.

Most preferred organometallic compounds are organoaluminium compounds. A most preferred organoaluminium compound is triethylaluminium (TEA).

Support Material

The porous mineral oxide is advantageously chosen from silica, alumina or mixtures thereof but preferably it is silica.

Suitable silicas are those having surface areas in the range 100 to 1000 $m^2/g$, preferably in the range 200 to 600 $m^2/g$.

Suitable silica have an average particle diameter between 15 micrometers and 150 micrometers (15 μm<d50<150 μm).

Suitable silicas include Grace Davison Sylopol 2229 and 2408 silicas or ES70 or CS2050 silicas from PQ Corporation.

The support material may be subjected to a heat treatment (calcination) to reduce the water content or the hydroxyl content of the support material. Prior to its use the support material may be subjected to treatment at 25° C. to 1000° C., preferably at 100° C. to 1000° C. and most preferably at 150° C.-850° C. under an inert gas flow or under reduced pressure.

Thermal Treatment

The functionalized support is subjected to a thermal treatment under an inert gas such as argon or nitrogen and is carried out a temperature in the range 100-600° C. and most preferably in the range 150-450° C.

The support is then further subjected to treatment under an atmosphere comprising oxygen at temperature in the range 70-600° C., preferably in the range 100-600° C. and most preferably in the range 150-450° C.

The atmosphere may comprise air or pure oxygen or mixtures thereof.

According to a further aspect of the present invention there is provided an activating support comprising a porous mineral oxide support material, fluorine and a Group 1, 2 or 13 metal, said support prepared by a method comprising contacting a fluorine-containing compound having a reactive group, an organometallic compound having a Group 1, 2 or 13 metal and said porous mineral oxide support material, characterised in that the organometallic compound and fluorine containing compound. are contacted together before contact with the porous mineral oxide support material.

The activating supports of the present invention may be suitably prepared by a different order of the above described process steps.

Thus according to a further aspect of the present invention there is provided an activating support comprising a porous mineral oxide support material, fluorine and a Group 1, 2 or 13 metal, said support prepared by a method comprising contacting a fluorine-containing compound having a reactive group, an organometallic compound having a Group 1, 2 or 13 metal and said porous mineral oxide support material, characterised in that the organometallic compound is contacted with the porous mineral oxide support material before the addition of the fluorine containing compound.

Thus according to a further aspect of the present invention there is provided an activating support comprising a porous mineral oxide support material, fluorine and a Group 1, 2 or 13 metal, said support prepared by a method comprising contacting a fluorine-containing compound having a reactive group, an organometallic compound having a Group 1, 2 or 13 metal and said porous mineral oxide support material, characterised in that the fluorine containing compound is contacted with the porous mineral oxide support material before the addition of the organometallic compound.

The fluorine-containing compound is as defined above.

The preferred activating supports according to the aspect of the present invention are those wherein the porous mineral oxide support material is silica.

By use of the method of the present invention activating supports may be prepared having a higher ratio of F/Al than previous known supports.

Supports described in the prior art and typified by the aforementioned WO 2007/014889 exhibit F/Al ratios below 1.7. Such supports are prepared by use of a fluorination step using for example $(NH_4)_2SiF_6$ or diethylaluminium fluoride. The present inventors have surprisingly found that the present method, avoiding such a fluorination step, results in supports having a higher ratio of F/Al.

Thus according to another aspect of the present invention there is provided a support comprising a porous mineral oxide support material, aluminium and fluorine, said support having a F/Al ratio of >1.8.

Preferably the supports have a F/Al ratio in the range 1.8-10, more preferably in the range 1.9-3.0 and most preferably in the range 1.95-2.3.

By F/Al ratio is meant the molar ratio of fluorine to aluminium based on the wt % content determined by elemental analysis as described below.

The preferred activating supports according to this aspect of the present invention are those wherein the porous mineral oxide support material is silica.

The preferred supports according to this aspect of the present invention comprise silicon, aluminium and fluorine.

According to another aspect of the present invention there is provided an activating support prepared as described above.

The activating supports of the present invention may suitably be used as components of olefin polymerization catalyst systems and as such may be combined with polymerization catalysts, in particular comprising transition metal compounds.

The polymerisation catalyst may typically be a transition metal complex of Groups 3 to 12 of the Periodic Table of Elements (IUPAC Version). Examples of such complexes are well known in the art.

There have been developed several different families of metallocene complexes. In earlier years catalysts based on bis(cyclopentadienyl) metal complexes were developed, examples of which may be found in EP 129368 or EP 206794. More recently complexes having a single or mono cyclopentadienyl ring have been developed. Such complexes have been referred to as 'constrained geometry' complexes and examples of these complexes may be found in EP 416815 or EP 420436. In both of these complexes the metal atom eg. zirconium is in the highest oxidation state.

Other complexes however have been developed in which the metal atom may be in a reduced oxidation state. Examples of both the bis(cyclopentadienyl) and mono (cyclopentadienyl) complexes have been described in WO 96/04290 and WO 95/00526 respectively.

The above metallocene complexes have typically been utilised for polymerization in the presence of a cocatalyst or activator. Typically activators are aluminoxanes, in particular methyl aluminoxane or alternatively may be compounds based on boron compounds.

Examples of the latter are borates such as trialkyl-substituted ammonium tetraphenyl- or tetrafluorophenyl-borates or triarylboranes such as tris(pentafluorophenyl) borane. Catalyst systems incorporating borate activators are described in EP 561479, EP 418044 and EP 551277.

More recently other single site catalyst systems have been developed. For example based on metal complexes comprising late transition metals such as iron, cobalt, ruthenium and manganese.

Examples of such compounds are described in WO 98/27124, WO 99/12981, EP 1015501 and EP 1276777 and may be illustrated by [2,6-diacetylpyridinebis(2,6-diisopropylanil)FeCl$_2$], 2.6-diacetylpyridinebis (2,4,6-trimethylanil) FeCl$_2$ and [2,6-diacetylpyridinebis(2,6-diisopropylanil) CoCl$_2$].

Chem Rev 2003, 103, 283-315, Chem Rev 2000, 100, 1169-1203 and Angew Chem Int Ed 1999, 38, 428-447 provide further details of suitable metallocene complexes and other single site catalysts.

Other catalysts include derivatives of Groups 3-4 or Lanthanide metals which are in the +2, +3 or +4 formal oxidation state. Preferred compounds include metal complexes containing from 1 to 3 anionic or neutral ligand groups which may be cyclic or non-cyclic delocalized π-bonded anionic ligand groups. Examples of such π-bonded anionic ligand groups are conjugated or non-conjugated, cyclic or non-cyclic dienyl groups, allyl groups, boratabenzene groups, phosphole and arene groups. By the term π-bonded is meant that the ligand group is bonded to the metal by a sharing of electrons from a partially delocalised π-bond.

Each atom in the delocalized π-bonded group may independently be substituted with a radical selected from the group consisting of hydrogen, halogen, hydrocarbyl, halohydrocarbyl, hydrocarbyl, substituted metalloid radicals wherein the metalloid is elected from Group 14 of the Periodic Table. Included in the term "hydrocarbyl" are C1-C20 straight, branched and cyclic alkyl radicals, C6-C20 aromatic radicals, etc. In addition two or more such radicals may together form a fused ring system or they may form a metallocycle with the metal.

Examples of suitable anionic, delocalised π-bonded groups include cyclopentadienyl, indenyl, fluorenyl, tetrahydroindenyl, tetrahydrofluorenyl, octahydrofluorenyl, etc. as well as phospholes and boratabenzene groups.

Phospholes are anionic ligands that are phosphorus containing analogues to the cyclopentadienyl groups. They are known in the art and described in WO 98/50392.

The boratabenzenes are anionic ligands that are boron containing analogues to benzene. They are known in the art and are described in Organometallics, 14, 1, 471-480 (1995).

The preferred polymerisation catalysts of the present invention comprise bulky ligand compounds also referred to as metallocene complexes containing at least one of the aforementioned delocalized π-bonded group, in particular cyclopentadienyl ligands. Such metallocene complexes are those based on Group IVA metals for example titanium, zirconium and hafnium.

Metallocene complexes may be represented by the general formula:

L$x$MQ$n$ where L is a cyclopentadienyl ligand, M is a Group 4 metal, Q is a leaving group and x and n are dependent upon the oxidation state of the metal.

Typically the Group 4 metal is titanium, zirconium or hafnium, x is either 1 or 2 and typical leaving groups include halogen or hydrocarbyl. The cyclopentadienyl ligands may be substituted for example by alkyl or alkenyl groups or may comprise a fused ring system such as indenyl or fluorenyl.

Examples of suitable metallocene complexes are disclosed in EP 129368 and EP 206794. Such complexes may be unbridged eg. bis(cyclopentadienyl)zirconium dichloride, bis (pentamethyl)cyclopentadienyl dichloride, or may be bridged eg. ethylene bis(indenyl)zirconium dichloride or dimethylsilyl(indenyl)zirconium dichloride.

Other suitable bis(cyclopentadienyl)metallocene complexes are those bis(cyclopentadienyl)diene complexes described in WO 96/04290. Examples of such complexes are bis(cyclopentadienyl)zirconium (2.3-dimethyl-1,3-butadiene) and ethylene bis(indenyl)zirconium 1,4-diphenyl butadiene.

Examples of monocyclopentadienyl or substituted monocyclopentadienyl complexes suitable for use in the present invention are described in EP 416815, EP 418044. EP 420436 and EP 551 277. Suitable complexes may be represented by the general formula:

CpMX$_n$ wherein Cp is a single cyclopentadienyl or substituted cyclopentadienyl group optionally covalently bonded to M through a substituent, M is a Group 4 metal bound in a η$^5$ bonding mode to the cyclopentadienyl or substituted cyclopentadienyl group, X each occurrence is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms or optionally one X together with Cp forms a metallocycle with M and n is dependent upon the valency of the metal.

Particularly preferred monocyclopentadienyl complexes have the formula:

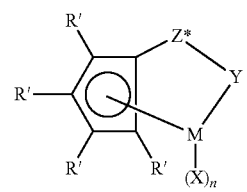

wherein:—

R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms, Y is —O—, —S—, —NR*—, —PR*—, M is hafnium, titanium or zirconium, Z* is SiR*$_2$, CR*$_2$, SiR*$_2$SiR*$_2$, CR*$_2$CR*$_2$, CR*=CR*, CR*$_2$SiR*$_2$, or GeR*$_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system, and n is 1 or 2 depending on the valence of M.

Examples of suitable monocyclopentadienyl complexes are (tert-butylamido) dimethyl (tetramethyl-$\eta^5$-cyclopentadienyl)silanetitanium dichloride and (2-methoxyphenylamido) dimethyl (tetramethyl-$\eta^5$-cyclopentadienyl)silanetitanium dichloride.

Other suitable monocyclopentadienyl complexes are those comprising phosphinimine ligands described in WO 99/40125, WO 00/05237, WO 00/05238 and WO00/32653. A typical examples of such a complex is cyclopentadienyl titanium [tri (tertiary butyl)phosphinimine]dichloride.

Another type of polymerisation catalyst suitable for use in the present invention are monocyclopentadienyl complexes comprising heteroallyl moieties such as zirconium (cyclopentadienyl)tris(diethylcarbamates) as described in U.S. Pat. No. 5,527,752 and WO 99/61486.

Particularly preferred metallocene complexes for use in the preparation of the supported catalysts of the present invention may be represented by the general formula:

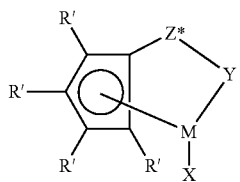

wherein:—

R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is a neutral $\eta^4$ bonded diene group having up to 30 non-hydrogen atoms, which forms a $\pi$-complex with M;

Y is —O—, —S—, —NR*—, —PR*—,

M is titanium or zirconium in the +2 formal oxidation state;

Z* is SiR*$_2$, CR*$_2$, SiR*$_2$SiR*$_2$, CR*$_2$CR*$_2$, CR*=CR*, CR*$_2$SiR*$_2$, or GeR*$_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system.

Examples of suitable X groups include s-trans-$\eta^4$-1,4-diphenyl-1,3-butadiene, s-trans-$\eta^4$-3-methyl-1,3-pentadiene; s-trans-$\eta^4$-2,4-hexadiene; s-trans-$\eta^4$-1,3-pentadiene; s-trans-$\eta^4$-1,4-ditolyl-1,3-butadiene; s-trans-$\eta^4$-1,4-bis(trimethylsilyl)-1,3-butadiene; s-cis-$\eta^4$-3-methyl-1,3-pentadiene; s-cis-$\eta^4$-1,4-dibenzyl-1,3-butadiene; s-cis-$\eta^4$-1,3-pentadiene; s-cis-$\eta^4$-1,4-bis(trimethylsilyl)-1,3-butadiene said s-cis diene group forming a x-complex as defined herein with the metal.

Most preferably R' is hydrogen, methyl, ethyl, propyl, butyl, pentyl, hexyl, benzyl, or phenyl or 2 R' groups (except hydrogen) are linked together, the entire C$_5$R'$_4$ group thereby being, for example, an indenyl, tetrahydroindenyl, fluorenyl, terahydrofluorenyl, or octahydrofluorenyl group.

Highly preferred Y groups are nitrogen or phosphorus containing groups containing a group corresponding to the formula —N(R″)— or —P(R″)— wherein R″ is C$_{1-10}$ hydrocarbyl.

Most preferred complexes are amidosilane- or amidoalkanediyl complexes.

Most preferred complexes are those wherein M is titanium.

Specific complexes suitable for use in the preparation of the supported catalysts of the present invention are those disclosed in WO 95/00526 and are incorporated herein by reference.

A particularly preferred complex for use in the preparation of the supported catalysts of the present invention is (t-butylamido) (tetramethyl-$\eta^5$-cyclopentadienyl)dimethyl silanetitanium-$\eta^4$-1.3-pentadiene.

The loading (transition metal) in the supported catalysts of the present invention is typically in the range 0.1 μmol/g to 1 mmol/g.

The polymerization catalyst and activating supports may be combined in any suitable manner.

Preferably the activating support and the polymerization catalyst are combined in a suitable solvent.

The activated supported catalyst system may optionally be used in the presence of scavenger material such as an organometallic compound.

Preferably the organometallic compound is an organoaluminium compound.

The most preferred organoaluminium compounds are triisobutylaluminum and triethylaluminium.

According to another aspect of the present invention there is provided a catalyst system for the polymerisation of olefins comprising (a) a transition metal compound, and (b) an activated support as hereinbefore defined or prepared by the process defined above.

The preferred transition metal compound is a metallocene.

The supported catalyst systems of the present invention are most suitable for use in slurry or gas phase processes.

A slurry process typically uses an inert hydrocarbon diluent and temperatures from about 0° C. up to a temperature just below the temperature at which the resulting polymer becomes substantially soluble in the inert polymerisation medium. Suitable diluents include toluene or alkanes such as hexane, propane or isobutane. Preferred temperatures are from about 30° C. up to about 200° C. but preferably from about 60° C. to 00° C. Loop reactors are widely used in slurry polymerisation processes.

Gas phase processes for the polymerisation of olefins, especially for the homopolymerisation and the copolymerisation of ethylene and α-olefins for example 1-butene, 1-hexene, 1-octene, 4-methyl-1-pentene are well known in the art.

Typical operating conditions for the gas phase are from 20° C. to 100° C. and most preferably from 40° C. to 85° C. with pressures from subatmospheric to 100 bar.

Particularly preferred gas phase processes are those operating in a fluidised bed. Examples of such processes are described in EP 89691 and EP 699213 the latter being a particularly preferred process for use with the supported catalysts of the present invention.

Particularly preferred polymerisation processes are those comprising the polymerisation of ethylene or the copolymerisation of ethylene and t-olefins having from 3 to 10 carbon atoms.

Thus according to another aspect of the present invention there is provided a process for the polymerisation of ethylene or the copolymerisation of ethylene and α-olefins having from 3 to 10 carbon atoms, said process performed under polymerisation conditions in the presence of a supported catalyst system prepared as hereinbefore described.

The preferred α-olefins are 1-butene, 1-hexene, 4-methyl-1-pentene and 1-octene.

The most preferred α-olefin is 1-hexene.

ADVANTAGES

The activating supports of the present invention provide supported polymerization catalyst systems having excellent activities.

The preparative route is easier than prior art methods and has the advantage of avoiding the use of a fluorination step involving the liberation of hydrogen fluoride. The route is also more economic than typical supported metallocene catalyst systems based on aluminoxanes or borates as activators.

The use of the activating supports as components of catalyst systems for the polymerization of olefins also leads to improvements in the rheology properties of the resultant polymers in particular improved processability.

The present invention will now be further illustrated with reference to the following examples:

EXAMPLES

Method for Elemental Analyses (a) Fluoride

The fluoride content was determined by potentiometric analysis using a selective electrode. For this purpose the sample was prepared by Wurzschmitt combustion followed by acidic work-up. These methods are well known in the art.

The principle of combustion according Wurzschmitt lies in the quantitative conversion of fluorinated species into inorganic fluorides following a combustion reaction that takes place explosively in an airtight pure nickel bombs in which was introduce the sample, ethylene glycol to the ignition, and sodium peroxide as an oxidant.

The combustion residues are taken up in deionized water. The excess of sodium peroxide is hydrolyzed. The hydrogen peroxide formed is decomposed by adding a cobalt salt and a gentle boil. Once the residual solution is brought to the required pH (~5 with $HNO_3$), the quantity of fluoride ions in the solution is determined via selective electrode. The assay is performed by external calibration (potential versus log of the concentration of fluoride). Standard solutions (prepared from NaF) and samples are measured under the same conditions.

The addition of a suitable buffer (cyclohexylenediaminetetraacetic acid) is used to adjust the pH to fix the ionic strength of the solution and break the complexed molecules thereby measuring the concentration of fluoride ions.

From the potentials measured in the samples, the concentrations of fluoride ions are then calculated using the parameters of the calibration curve previously established.

(b) Aluminium

Aluminium content was determined by X-ray Fluorescence Spectroscopy. For this purpose the sample was calcined in a Pt—Au crucible in the presence of lithium tetraborate. At a temperature of between 1000 and 1100° C., the catalyst is dissolved in the molten borate. The resulting homogeneous glass is shaped into discs which are examined in a X-ray fluorescence spectrometer The instrument calibration is performed with tetra-borate glasses containing lithium sales of elements to be determined in known amounts.

Example 1

Preparation of Activated Support S1

(a) Thermal Treatment of Support

Silica (CS2050 from PQ Corporation) was subjected to the following heating procedure under nitrogen flow in 15 g batches:
from 30° C. to 100° C. in one hour
from 100° C. to 130° C. in 30 minutes
from 130° C. to 450° C. in one hour
maintained at 450° C. during four hours The resulting silica has a surface silanol concentration of 2.1 mmol per gram.

(b) Reaction of Pentafluorophenol with Organoaluminum Compound

To a suspension of 10 g of pentafluorophenol (54.35 mmoles) in dry toluene at 0° C. was added 55 mL of triethylaluminum (1M in dry hexane, 55 mmoles) by dropwise addition and the mixture was stirred one hour at 0° C. to yield product A.

(c) Functionalization of Support

To a suspension of 15 g of the above calcined silica was added 37.8 mmoles of the above product A (1.2 equivalent/surface silanol groups), at room temperature. This suspension was stirred during one hour. The solvent was removed by decantation and the silica washed with dry hexane (5×50 mL). The resulting modified silica was then dried under vacuum.

This modified silica was then subjected to heated nitrogen fluid bed, followed by a heated dry air fluid bed as follows:
Heated Nitrogen Fluid Bed:
from 30° C. to 130° C. in one hour
maintained at 130° C. for one hour
from 130° C. to 450° C. in one hour
maintained art 450° C. for four hours
Heated Dry Air Fluid Bed:
from 30° C. to 130° C. in one hour
maintained at 130° C. for two hours
from 130° C. to 450° C. in one hour
maintained at 450° C. for eight hours
Elemental analysis: Al, 3.73 wt %; F, 5.15 wt %; [F/Al=1.96]
maintained at 130° C. for one hour
from 130° C. to 450° C. in one hour
maintained art 450° C. for four hours
Heated Dry Air Fluid Bed:
from 30° C. to 130° C. in one hour
maintained at 130° C. for two hours
from 130° C. to 450° C. in one hour
maintained at 450° C. for eight hours
Elemental analysis: Al, 3.73 wt %; F, 5.15 wt %; [F/Al=1.96]

Example 2

Preparation of Activating Support S2

(a) Thermal Treatment of Silica

The silica (CS2050 from PQ Corporation) was subjected to the following heating procedure under nitrogen flow in 15 g batches
- from 30° C. to 100° C. in one hour
- from 100° C. to 130° C. in 30 minutes
- from 130° C. to 250° C. in one hour
- maintained at 250° C. during four hours The resulting silica has a surface silanol concentration of 2.5 mmol per gram when activation temperature is 250° C.

(b) Reaction of 2,2,2-Trifluoroethanol with Organoaluminum Compound

To 45 mL of triethylaluminum (1 M in dry hexane, 45 mmoles) at 0° C. was added 3.22 mL of 2,2,2-trifluoroethanol (4.51 g, 45 mmoles) by dropwise addition and the mixture was stirred for one hour at 0° C. to yield product B.

(c) Functionalization of Support

To a suspension of 15 g of above calcined silica was added 45 mmoles of R (1.2 equivalent/surface silanol groups), at room temperature. This suspension was stirred during one hour. The solvent was removed by decantation and the silica washed with dry hexane (5×50 mL). The resulting modified silica was then dried under vacuum.

This modified silica was then subjected to heated nitrogen fluid bed, followed by a heated dry air fluid bed as follows:

Heated Nitrogen Fluid Bed:
- from 30° C. to 130° C. in one hour
- maintained at 130° C. during one hour
- from 130° C. to 450° C. in one hour
- maintained at 450° C. during four hours Heated Dry Air Fluid Bed:
- from 30° C. to 130° C. in one hour
- maintained at 130° C. during two hour
- from 130° C. to 450° C. in one hour
- maintained at 450° C. during eight hours

Example 3

Preparation of Activating Support S3

(a) Thermal Treatment of Silica

The silica (CS2050 from PQ Corporation) was subjected to the following heating procedure under nitrogen flow in 15 g batches
- from 30° C. to 100° C. in one hour
- from 100° C. to 130° C. in 30 minutes
- from 130° C. to 450° C. in one hour
- maintained at 450° C. during four hours The resulting silica has a surface silanol concentration of 2.1 mmol per gram when activation temperature is 450° C.

(b) Reaction of 2,2,2-Trifluoroethanol with Organoaluminum Compound

To 20.3 mL of triethylaluminum (1 M in dry hexane, 20.3 mmoles) at 0° C. was added 1.45 mL of 2,2,2-trifluoroethanol (2.03 g, 20.3 mmoles) by dropwise addition and the mixture was stirred for one hour at 0° C. to yield product B.

(c) Functionalization of Support

To a suspension of 8 g of above calcined silica was added 20.3 mmoles of B (1.2 equivalent/surface silanol groups), at room temperature. This suspension was stirred during one hour. The solvent was removed by decantation and the silica washed with dry hexane (5×50 mL). The resulting modified silica was then dried under vacuum.

This modified silica was then subjected to heated nitrogen fluid bed, followed by a heated dry air fluid bed as described in example 2.

Example 4

Preparation of Activating Support S4

(a) Thermal Treatment of Silica

The silica (CS2050 from PQ Corporation) was subjected to the following heating procedure under nitrogen flow in 15 g batches
- from 30° C. to 100° C. in one hour
- from 100° C. to 130° C. in 30 minutes
- from 130° C. to 250° C. in one hour
- maintained at 250° C. during four hours The resulting silica has a surface silanol concentration of 2.5 mmol per gram when activation temperature is 250° C.

(b) Reaction of 1,1,1,3,3,3-Hexafluoropropan-2-Ol with Organoaluminum Compound

To 42.7 mL of triethylaluminum (1 M in dry hexane, 42.7 mmoles) at 0° C. was added 3.57 mL of 1,1,1,3,3,3-hexafluoropropan-2-ol (5.8 g, 34.4 mmoles) by dropwise addition and the mixture was stirred one hour at 0° C. to yield product C.

(c) Functionalization of Support

To a suspension of 14.28 g of above calcined silica was added 34.4 mmoles of C (1.04 equivalent surface silanol groups), at room temperature. This suspension was stirred during one hour. The solvent was removed by decantation and the silica washed with dry hexane (5×50 mL). The resulting modified silica was then dried under vacuum.

This modified silica was then subjected to heated nitrogen fluid bed, followed by a heated dry air fluid bed as described in example 2.

Example 5

Preparation of Activating Support S5

(a) Thermal Treatment of Silica

The silica (CS2050 from PQ Corporation) was subjected to the following heating procedure under nitrogen flow in 15 g batches
- from 30° C. to 100° C. in one hour
- from 100° C. to 130° C. in 30 minutes
- from 130° C. to 450° C. in one hour
- maintained at 450° C. during four hours The resulting silica has a surface silanol concentration of 2.1 mmol per gram when activation temperature is 450° C.

(b) Reaction of 1,1,1,3,3,3-hexafluoropropan-2-ol with Organoaluminum Compound

To 15.4 mL of triethylaluminum (1 M in dry hexane, 15.4 mmoles) at 0° C. was added 1.61 mL of 1,1,1,3,3,3-hexafluoropropan-2-ol (2.6 g, 15.5 mmoles) by dropwise addition and the mixture was stirred for one hour at 0° C. to yield product C.

(c) Functionalization of Support

To a suspension of 6.04 g of above calcined silica was added 15.2 mmoles of C (1.2 equivalent/surface silanol groups), at room temperature. This suspension was stirred during one hour. The solvent was removed by decantation and the silica washed with dry hexane (5×50 mL). The resulting modified silica was then dried under vacuum.

This modified silica was then subjected to heated nitrogen fluid bed, followed by a heated dry air fluid bed as described in example 2.

Example 6 (Comparative Example)

Activating Support CE

A support was prepared using the following procedure according to WO 2007/014889:
  silica dehydroxylation at 45° C. under nitrogen fluid bed (2.1 mmol of silanol groups g)
  silica alkylation with triethylaluminum (2 equivalents/silanol groups)
  washings with an alkane and drying under vacuum
  heated nitrogen fluid bed, heated dry air fluid bed and finally heated
  in a nitrogen fluid bed with 10 wt % of $(NH_4)_2SiF_6$.
  Elemental analysis: Al, 5.9 wt %; F, 7 wt %.

Elemental Analyses Summary:

| Support | Activation temp of silica (° C.) | F Content (wt %) | Al Content (wt %) | F/AL (mol/mol) |
|---|---|---|---|---|
| S1 | 450 | 5.15 | 3.73 | 1.96 |
| S2 | 250 | 7.7 | 4.9 | 2.2 |
| S3 | 450 | 6.7 | 4.7 | 2.04 |
| S4 | 250 | 8.7 | 5.5 | 2.23 |
| S5 | 450 | 7.9 | 4.9 | 2.26 |
| CE | 250 | 7.0 | 5.9 | 1.68 |

Slurry Bench Polymerizations
1. Catalyst Preparation:
  A premix of $(C_5Me_4SiMe_2N^tBu)Ti(\eta^4$-1,3-pentadiene) (2.525 mM in hexane) and triisobutylaluminum (1 M in hexane) was prepared at room temperature [Al/Ti (mol/mol)=50]. A portion of this solution was added to 100 mg activating support to reach a Ti loading of 30 μmol/gram of activating support.
2. Polymerization Conditions:
  A reactor was charged with 0.5 mL of a 0.5 M triisobutylaluminum (TiBA) solution (in hexane), 1.7 L of isobutane and 12 g of hexene-1. Temperature was raised to 80° C. and 10 bar of ethylene added with hydrogen (H2/C2=0.2 mol %). The catalyst suspension was then added into the reactor and temperature was raised to 90° C. Ethylene and hydrogen were fed continuously to the reactor to maintain a constant H2/C2 ratio of 0.2 mol % and an ethylene partial pressure of 10 bar. Polymerization runs were performed for one hour.
3. Polymerization Results:

| Run | Support (mg) | Ti (μmol) | Ti/support (wt %) | Ti/support (μmolTi/g) | Productivity (g/g) | Activity (kg/mmol/Ti/hr) |
|---|---|---|---|---|---|---|
| 1* | S1 (99 mg) | 3.0 | 0.14 | 30 | 2657 | 87 |
| 2* | S1 (65 mg) | 3.0 | 0.22 | 47 | 3000 | 64 |
| CE1* | CE (100 mg) | 4.5 | 0.14 | 30 | 2830 | 113 |
| CE2* | CE (120 mg) | 4.0 | 0.2 | 40 | 2200 | 66 |
| 3 | CE (103 mg) | 3 | 0.14 | 30 | 2000 | 68 |
| 4 | S2 (102 mg) | 3 | 0.15 | 30 | 2440 | 82.3 |
| 5 | S3 (99 mg) | 3 | 0.14 | 30 | 1414 | 46.2 |
| 6 | S3 (113 mg) | 4.4 | 0.2 | 40 | 1124 | 28.6 |
| 7 | S4 (100 mg) | 3 | 0.14 | 30 | 2150 | 70.9 |
| 8 | S4 (106 mg) | 4 | 0.2 | 40 | 1540 | 38 |
| 9 | S5 (103 mg) | 3 | 0.14 | 30 | 922 | 31.4 |

*Polymerizations trials were performed with 16 grams of hexene-1.

Gas Phase Polymerizations
1. Catalysts Formulations:
  The supports S2 and S4 were used to formulate two catalysts, following the same synthesis pathway:
  A premix of $(C_5Me_4SiMe_2N^tBu)Ti(\eta^4$-1,3-pentadiene) (2.525 mM in hexane) and triisobutylaluminum (1 M in hexane) was prepared at room temperature [Al/Ti mol/mol=50]. A portion of this solution was added to 100 mg activating support to reach a Ti loading of 30 μmol Ti/gram of activating support. After a reaction time of 30 minutes the solvent was removed under vacuum and a dry catalyst powder was obtained.
  Another catalyst was formulated using the comparative support (CE) as follows:
  A premix of $(C_5Me_4SiMe_2N^tBu)Ti(\eta^4$-1,3-pentadiene) (2.525 mM in hexane) and triisobutylaluminum (1 M in hexane) was prepared at room temperature {Al/Ti (mol/mol)=50]. A portion of this solution was added to 100 mg activating support to reach a Ti loading of 30 μmol Ti/gram of activating support. After a reaction time of 60 minutes the catalyst was washed 5 times with dry hexane solvent and the solvent removed under vacuum and a dry catalyst powder was obtained.
  An internal reference supported catalyst (metallocene catalyst prepared using the procedure according to WO 05/019275) was also studied.
2. Polymerization Conditions:
  Polymerization trials were performed at 10 bar of ethylene pressure at 80° C. for 60 minutes. Alkylated silica (SiOH/TEA) was injected as scavenger prior to catalyst addition. A dry salt was used as a seed bed. Catalysts were injected into the reactors at 80° C. with an isobutane flush. Activating support-based catalysts were suspended in mineral oil prior to injection whereas the internal reference catalyst was used as a dry powder.
  Hydrogen and hexene were regulated by use of a mass spectrometer in order to keep $H_2/C_2$ and $C_6/C_2$ molar ratios constant at respectively 0.13 and 0.55 mol/mol.
3. Polymerization Results:

| Run | Support (mg) | Ti (μmol) | Productivity (g/g) | Activity (kg/mmol/Ti/hr) |
|---|---|---|---|---|
| 10 | CE (25 mg) | 0.75 | 500 | 16.67 |
| 11 | S2 (24 mg) | 0.7 | 475 | 16.29 |
| 12 | S4 (29.9 mg) | 0.9 | 478 | 15.89 |
| 13 | internal reference (23 mg) | 1.4 | 461 | 7.57 |

Polymer Properties

Dynamic rheological measurements are carried out, according to ASTM D 4440, on a dynamic rheometer (e.g., ARES rheometer by TA Instruments) with 25 mm diameter parallel plates in a dynamic mode under an inert atmosphere. For all experiments, the rheometer has been thermally stable at 190° C. for at least 30 minutes before inserting the appropriately stabilised (with anti-oxidant additives), compression-moulded sample onto the parallel plates. The plates are then closed with a positive normal force registered on the meter to ensure good contact. After about 5 minutes at 190° C., the plates are lightly compressed and the surplus polymer at the circumference of the plates is trimmed. A further 10 minutes is allowed for thermal stability and for the normal force to decrease back to zero. That is, all measurements are carried out after the samples have been equilibrated at 190° C. for about 15 minutes and are run under full nitrogen blanketing.

Two strain sweep (SS) experiments are initially carried out at 190° C. to determine the linear viscoelastic strain that would generate a torque signal which is greater than 10% of the lower scale of the transducer, over the full frequency (e.g. 0.01 to 100 rad/s) range. The first SS experiment is carried out with a low applied frequency of 0.1 rad/s. This test is used to determine the sensitivity of the torque at low frequency. The second SS experiment is carried out with a high applied frequency of 100 rad/s. This is to ensure that the selected applied strain is well within the linear viscoelastic region of the polymer so that the oscillatory rheological measurements do not induce structural changes to the polymer during testing. In addition, a time sweep (TS) experiment is carried out with a low applied frequency of 0.1 rads at the selected strain (as determined by the SS experiments) to check the stability of the sample during testing.

Measurement of Melt Elastic Modulus G' (G"=500 Pa) at 190° C.:

The frequency sweep (FS) experiment is then carried out at 190° C. using the above appropriately selected strain level and the dynamic rheological data thus measured are then analysed using the rheometer software (viz., Rheometrics RHIOS V4.4 or Orchestrator Software) to determine the melt elastic modulus G' (G" 500 Pa) at a constant reference value (500 Pa) of melt viscous modulus (G").

Polymers produced using the novel activating supports of the present invention show improved rheological properties. In particular higher viscosities were observed at lower shear rates providing better bubble stability and lower viscosities at higher shear rates resulting in a better processability in the extruder.

BRIEF DESCRIPTION OF THE DRAWINGS

The invention is further described with reference to the accompanying drawings, in which.

Figure 1:
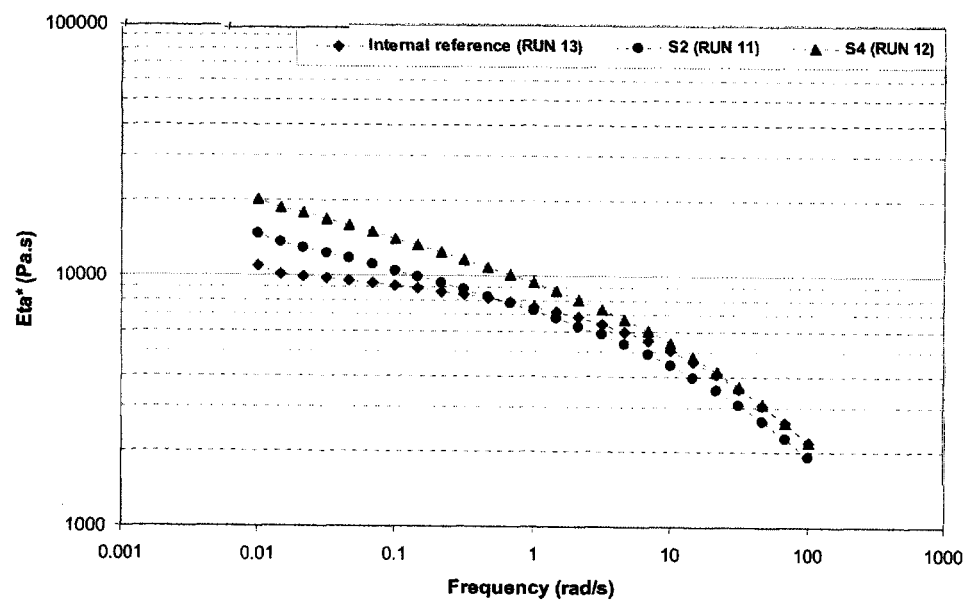
FIG. 1 illustrates the specific viscosity and shear rate for polymers prepared in Runs 11 and 12 compared with the internal reference polymer (Run 13) showing the improved rheology of polymers prepared using the inventive activating supports compared with a traditional supported catalyst system used in the presence of a separate activator.
Figure 2:
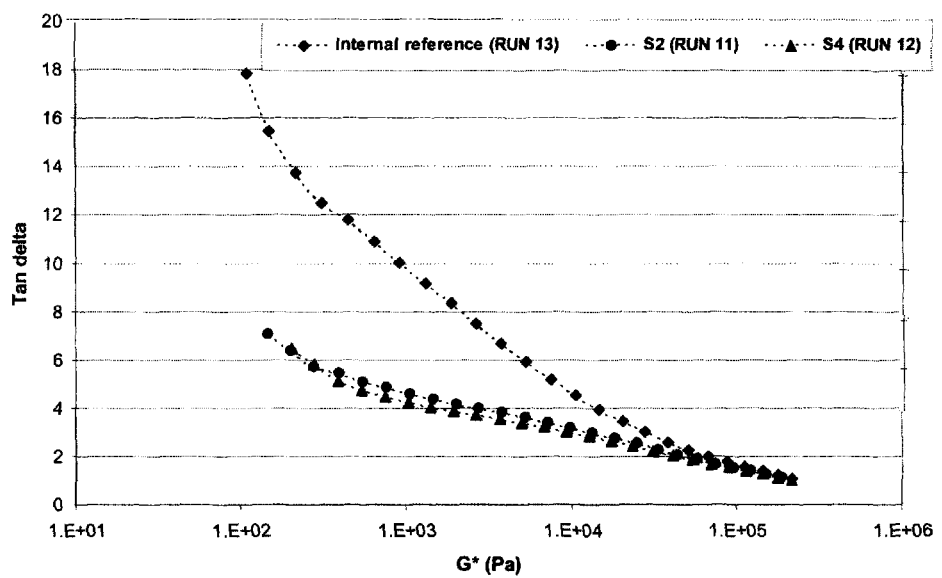
FIG. 2 illustrates the Tan delta=f(G*) for polymers produced in Runs 11 and 12 compared with the internal reference polymer from Run 13. Tan delta may be representative of the presence of long chain branching (LCB) in polymers. The lower the Tan delta the higher the level of LCB.

As noted the internal reference polymer was prepared according to WO 05/019275 and represents the use of a catalyst system known to produce polymers having small amounts of LCB.

The presence of LCB also leads to an improved rheology. Thus, the polymers are more processable in the extruder and exhibit good bubble stability particularly suitable for film applications.

The invention claimed is:

1. An activating support having a F/Al molar ratio in the range 1.8-10 prepared by the steps of
    (a) combining (i) a fluorine-containing compound having a reactive group and (ii) an organoaluminium compound,
    (b) contacting a porous mineral oxide support material with the mixture from step (a),
    (c) heating the functionalized support from step (b) under an inert gas and then under an atmosphere comprising oxygen, and
    (d) recovering the activating support.

2. An activating support according to claim 1 wherein the fluorine-containing compound has the formula:

R(F$n$)-X wherein
R is hydrocarbyl, substituted hydrocarbyl, heterohydrocarbyl or substituted heterohydrocarbyl with up to 20 non-hydrogen atoms,
n is 1-41
X is OH, SH or NR'$_2$
R' is hydrogen or hydrocarbyl.

3. An activating support according to claim 2 wherein n is 1-6.

4. An activating support according to claim 2 wherein X is OH.

5. An activating support according to claim 1 wherein the fluorine-containing compound is chosen from pentafluorophenol, 2,2,2-trifluoroethanol or 1,1,1,3,3,3-hexafluoropropan-2-ol.

6. An activating support according to claim 1 wherein the organoaluminium compound is triethylaluminium.

7. An activating support according to claim 1 wherein the porous mineral oxide support material is silica.

8. An activating support according to claim 1 wherein the functionalized support from step (b) is heated under an inert gas at a temperature in the range 100-600° C. and preferably in the range 150-450° C.

9. An activating support according to claim 1 wherein the functionalized support from step (b) is heated under an atmosphere comprising oxygen at a temperature in the range 70-600° C., preferably in the range 100-600° C. and most preferably in the range 150-450° C.

10. An activating support having a F/Al molar ratio in the range 1.8-10 comprising a porous mineral oxide support material, fluorine and a Group 1, 2 or 13 metal, said support prepared by a method comprising contacting a fluorine-containing compound having a reactive group, an organometallic compound having a Group 1, 2 or 13 metal and said porous mineral oxide support material, wherein the organometallic compound and fluorine containing compound are contacted together before contact with the porous mineral oxide support material.

11. An activating support having a F/Al molar ratio in the range 1.8-10 comprising a porous mineral oxide support material, fluorine and a Group 1, 2 or 13 metal, said support prepared by a method comprising contacting a fluorine-containing compound having a reactive group, an organometallic compound having a Group 1, 2 or 13 metal and said porous mineral oxide support material, wherein the organometallic compound is contacted with the porous mineral oxide support material before the addition of the fluorine containing compound.

12. An activating support having a F/Al molar ratio in the range 1.8-10 comprising a porous mineral oxide support material, fluorine and a Group 1, 2 or 13 metal said support prepared by a method comprising contacting a fluorine-containing compound having a reactive group, an organometallic compound having a Group 1, 2 or 13 metal and said porous mineral oxide support material, wherein the fluorine containing compound is contacted with the porous mineral oxide support material before the addition of the organometallic compound.

13. An activating support according to claim 10 wherein the porous mineral oxide support is silica.

14. An activating support according to claim 10 wherein the fluorine-containing compound has the formula R(Fn)-X as hereinbefore described.

15. A supported catalyst system for the polymerisation of olefins comprising
(a) a transition metal compound, and
(b) an activated support according to claim 1.

16. A supported catalyst system according to claim 15 wherein the transition metal compound is a metallocene.

17. A supported catalyst system according to claim 16 wherein the metallocene has the general formula:

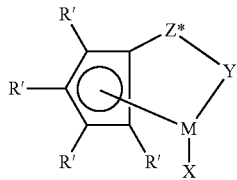

wherein:—
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is a neutral $\eta^4$ bonded diene group having up to 30 non-hydrogen atoms, which forms π-complex with M;

Y is —O—, —S—, —NR*—, —PR*—,

M is titanium or zirconium in the +2 formal oxidation state;

Z* is SiR*2, CR*2, SiR*2SiR*2, CR*2CR*2, CR*=CR*, CR*2SiR*2, or GeR*2, wherein:
R* each occurrence is independently hydrogen, or a member selected from hydrocarbyl, silyl, halogenated alkyl, halogenated aryl, and combinations thereof, said
R* having up to 10 non-hydrogen atoms, and optionally, two R* groups from Z* (when R* is not hydrogen), or an R* group from Z* and an R* group from Y form a ring system.

18. A catalyst system according to claim 17 wherein M is titanium.

19. A process for the polymerisation of ethylene or the copolymerisation of ethylene and α-olefins having from 3 to 10 carbon atoms, said process performed under polymerisation conditions in the presence of a supported catalyst system according to claim 15.

20. A process according to claim 19 performed in the slurry or gas phase.

21. A process according to claim 19 wherein the α-olefin is 1-hexene.

22. An activating support according to claim 1 having a F/Al molar ratio in the range 1.9-3.0.

23. An activating support according to claim 1 having a F/Al molar ratio in the range 1.95-2.3.

* * * * *